United States Patent [19]
Yeh et al.

[11] Patent Number: 5,254,860
[45] Date of Patent: Oct. 19, 1993

[54] APPARATUS FOR GUIDING AN OPTICAL CHARACTER READER OVER AN INFORMATION CONTAINING CARD

[75] Inventors: Chi-ping Yeh, San Ccueng; Meng-chia Tsai, Xien Chu, both of Taiwan

[73] Assignee: Industrial Technology Research Institute, Hsinchu, Taiwan

[21] Appl. No.: 919,490

[22] Filed: Jul. 24, 1992

[51] Int. Cl.$^5$ .............................................. G06K 7/10
[52] U.S. Cl. .................................. 250/566; 235/472; 235/482
[58] Field of Search ............... 250/566, 569, 571, 557; 235/472, 482, 483, 485, 486

[56] References Cited

U.S. PATENT DOCUMENTS

| | | | |
|---|---|---|---|
| 4,553,035 | 11/1985 | Malinsky et al. | 250/566 |
| 4,758,732 | 7/1988 | Kyriakides | 250/566 |
| 4,860,377 | 8/1989 | Ishigaki | 250/566 X |

Primary Examiner—David C. Nelms
Assistant Examiner—John R. Lee
Attorney, Agent, or Firm—Meltzer, Lippe, Goldstein

[57] ABSTRACT

An apparatus for supporting and guiding an optical character reader across a document containing information to be read, such as a business card or an identification card, comprises a frame having a top surface, and a pair of rails disposed on the top surface of the frame, the optical character reader being supported for sliding movement along the rails. An inner guide is located at a forward end of the apparatus. The inner guide includes a slot which receives the optical character reader and acts as a stop for it, thereby determining an initial position of the optical character reader. The top surface of the frame includes an inclined depression which is dimensioned for closely receiving the business or identification card. Desirably, the depression includes a clamping slot along a rear edge thereof into which the business or identification card can be inserted.

5 Claims, 2 Drawing Sheets

APPARATUS FOR GUIDING AN OPTICAL CHARACTER READER OVER AN INFORMATION CONTAINING CARD

BACKGROUND OF THE INVENTION

This invention relates to a guiding apparatus for an optical character reader. More particularly, the instant invention relates to an apparatus which supports an optical character reader and which guides it over a card containing information to be read by the optical character reader.

Optical character readers, sometimes called scanners, are commonly used for loading text from printed documents into computers. Optical character readers operate by causing them to pass over (scan) a region on a document or the like containing printed characters. The image of the characters is focussed by means of a lens onto an array of photoelectric transducers. A microprocessor inside the optical character reader recognizes the characters by comparing the light and dark portions of the scanned area with a reference matrix that is stored in a memory chip in the optical character reader.

Since each character must be individually scanned and recognized by the optical character reader, each character must be focussed onto the array of photoelectric transducers. In the past, this has necessitated that the optical character reader be physically repositioned along a line of print each time a character is to be read. Such positioning has proved to be a problem since most optical character readers are unable to recognize a character if it is inclined, even a slight amount with respect to the line of print that is being scanned. Since the scanning is usually performed manually, efficient scanning has in the past required an inordinate amount of patience and skill on the part of the operator.

U.S. Pat. No. 4,758,732 (Kyriakides) is an example of a prior art support and guiding apparatus for an optical character reader. The support and guiding apparatus disclosed therein includes a top frame, having a rail thereon. A hand-held optical character reader is mounted on the rail. A sheet of paper to be scanned by the optical character reader is inserted between a transparent top frame element and a bottom frame element which is spaced therefrom. The optical character reader slides along the rail scanning a line of text one character at a time. A window having tapered edges is provided in the top frame element through which an operator can insert a finger or thumb to advance the paper in a path transverse to the direction of movement of the optical character reader. In this way, the optical character reader does not become misaligned as it reads the characters on successive printed lines on the sheet.

The support and guiding apparatus in this prior art patent employs a transparent frame to hold the sheet being read in place so that the optical character reader can traverse the sheet. It also employs a frame having a single rail thereon which supports and guides the optical character reader for sliding movement so that it will be kept upright as the optical character reader scans across a line of text.

The support and guiding apparatus disclosed in this prior art patent is not entirely satisfactory. First, the use of a transparent frame to hold the sheet in place can lead to reflections reaching the optical character reader. Because of these reflections, the optical character reader may not correctly recognize the characters printed on the sheet being scanned. Second, because the optical character reader is mounted on a single rail, the optical character reader can twist to a certain extent as it is being moved along the rail, especially if it is pushed by one hand along one of its sides. This can cause the optical character reader to be slightly misaligned from a line being read. While the frame can be provided with two rails on which the optical character reader can be mounted in order to eliminate twisting, this can lead to difficulty in controlling the start and stop movements of the optical character reader. It may not be possible to fix the start and stop movements of the optical character as accurately as desired.

Furthermore, the apparatus disclosed in U.S. Pat. No. 4,758,732 is not well suited for scanning the information contained on an undersized document, for example, the information contained on a business card or an identification card. The apparatus disclosed therein is adapted for scanning full-sized documents which can be moved under the optical character reader via a fingerhole located at the edge of the top frame. Clearly, this apparatus would not work well for a small business card or identification card the edge of which does not reach the fingerhole.

Accordingly, it is an object of the present invention to provide a support and guiding apparatus for an optical character reader which does not suffer from the above deficiencies. In particular, it is an object of the present invention to provide a support and guiding apparatus for an optical character reader in which the information containing document is not placed underneath a transparent frame, and in which the start and stop movements of the optical character reader can be precisely controlled.

It is a further object of the present invention to provide a support and guiding apparatus which is well adapted for scanning information contained on an undersized document, such as a business card or an identification card.

SUMMARY OF THE INVENTION

These and other objects are achieved by means of the present invention which provides an apparatus for supporting and guiding an optical character reader across a document containing information to be read, comprising a frame having a top surface, first and second parallel rails on the top surface of the frame which support the optical character reader for sliding movement therealong, an inner guide located at a forward end of the frame, the inner guide including a slot into which the optical character reader is received, and a depression in the top surface disposed between the first and second rails and dimensioned to closely receive the document to be read.

The depression in the top surface of the frame serves to position the document to be read by the optical character reader. Desirably, the document to be read is a business card or an identification card, and the depression is dimensioned so that the card can be inserted therein. To facilitate insertion and withdrawal of the card, the depression can be inclined relative to the top surface. Furthermore, in order to prevent forward and backward movement of the card, a clamping slot can be provided along a bottom edge of the depression. When a card to be read is inserted into the clamping slot, further movement of the card will become much more difficult, thereby enhancing the positioning function of the frame.

The apparatus of the present invention includes a pair of rails on which the optical character reader is mounted for sliding movement. The use of two rails is inherently more stable than the use of a single rail. This prevents twisting of the optical character reader relative to a line of text to be read and thus reduces reading errors. Furthermore, the inner guide located at a forward end of the frame includes a slot into which the optical character is closely received. The front edge of the optical character reader abuts against a rear surface of this slot. In this way, when the scanner is moved manually, the precise starting point, as well as the ending point, can be known essentially.

In the apparatus of the present invention, no transparent layer is placed over the document to be read as in the apparatus of U.S. Pat. No. 4,758,732. Instead, the document is exposed directly to the optical character reader with no intervening transparent layer. Thus, the optical character reader is not exposed to any reflections caused by a transparent layer and reading errors are reduced.

Further details regarding the apparatus of the present invention are discussed below.

DETAILED DESCRIPTION OF A PREFERRED EMBODIMENT OF THE INVENTION

Figure 1:
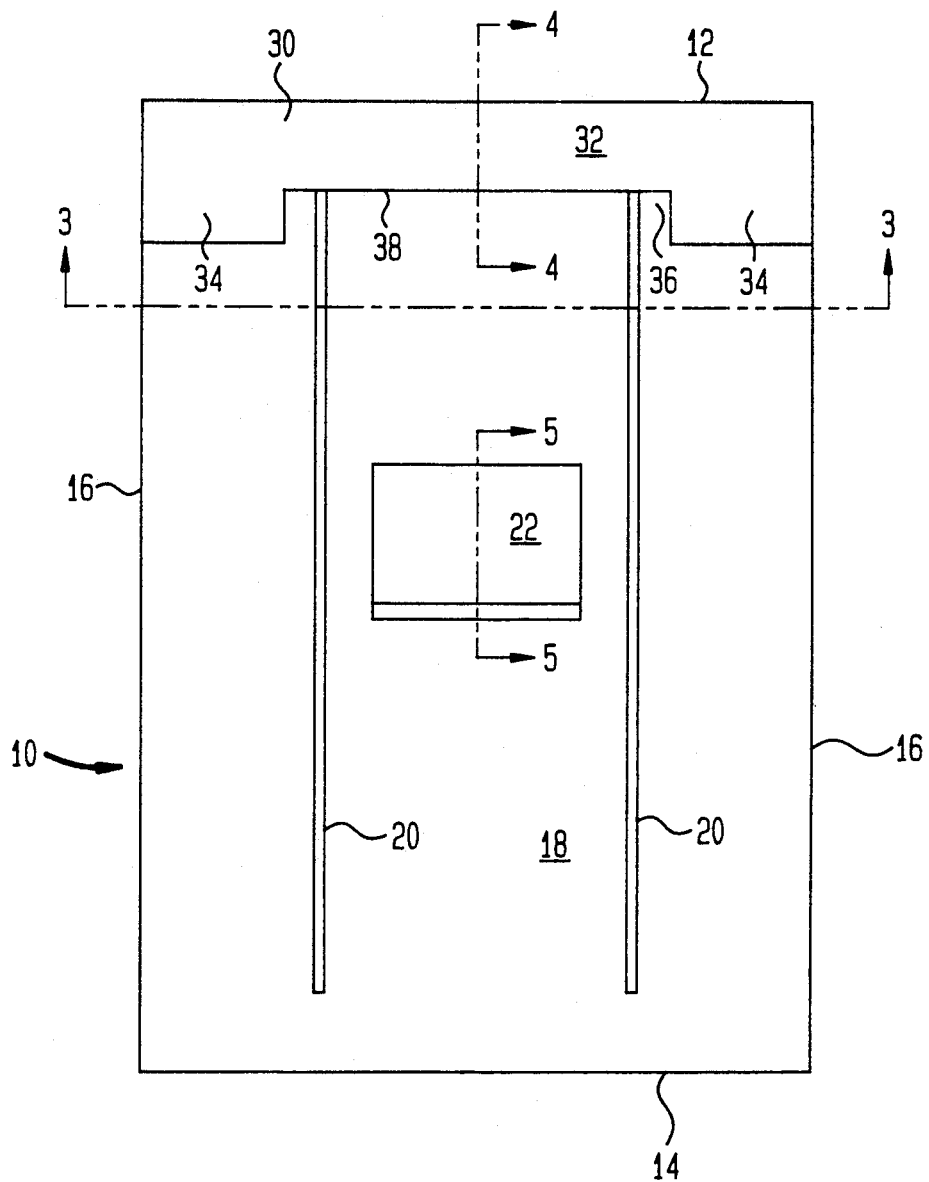
FIG. 1 is a top plan view of the support and guiding apparatus of the present invention.
Figure 2:
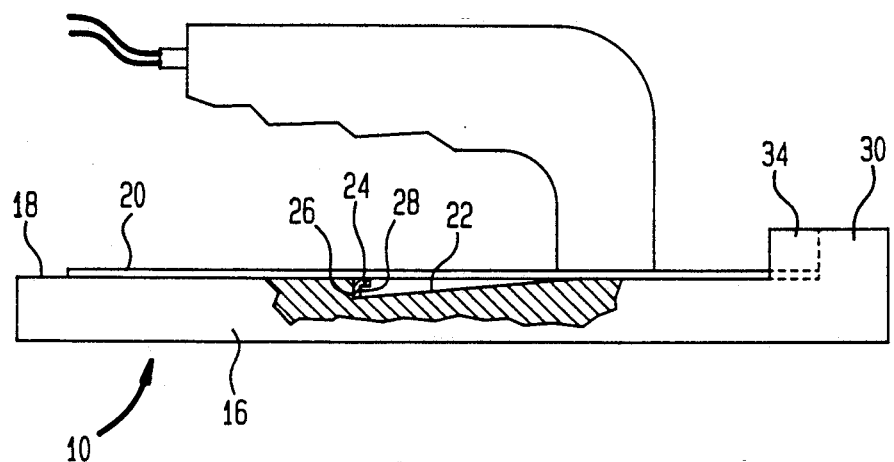
FIG. 2 is a side view of the inventive apparatus shown in FIG. 1.

Referring to FIGS. 1 and 2, a preferred embodiment of an apparatus for supporting and guiding an optical character reader is shown. The apparatus comprises a frame 10 having a front portion 12, a rear portion 14, and side portions 16,16. Two rails 20,20, preferably made from aluminum are mounted on a top surface 18 of frame 10. An optical character reader (FIG. 2) is mounted on the rails 20,20 by means of slots (not shown) in the underside of the character reader for sliding movement along a longitudinal direction.

Figure 5:
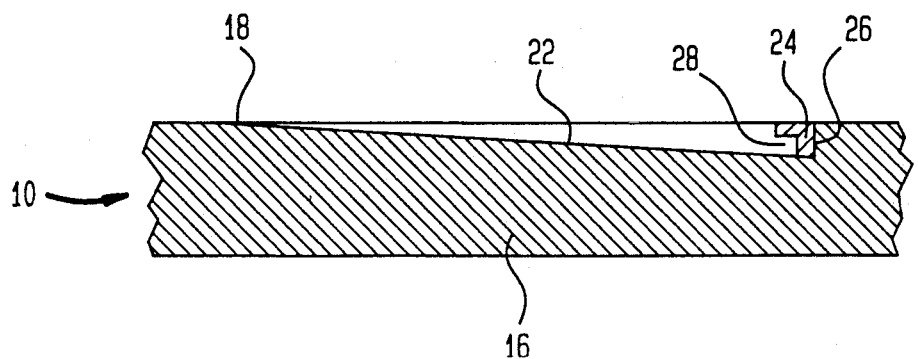
FIG. 5 is a sectional view of the inventive apparatus taken alone line 5—5 of FIG. 1.

A depression 22 in the top surface 18 is located approximately in the center of frame 10, between rails 20,20. Depression 22 is of a size which suitably accommodates a business card or an identification card. As best seen in FIGS. 2 and 5, depression 22 constitutes an incline in top surface 18. This facilitates insertion and withdrawal of the card. An elbow 24 is located along the rear edge 26 of depression 22 so that a clamping slot 28 is formed along said rear edge. When a card is inserted into depression 22, the clamping slot 28 impedes further movement of the card, thereby enhancing positioning of the card.

Figure 3:
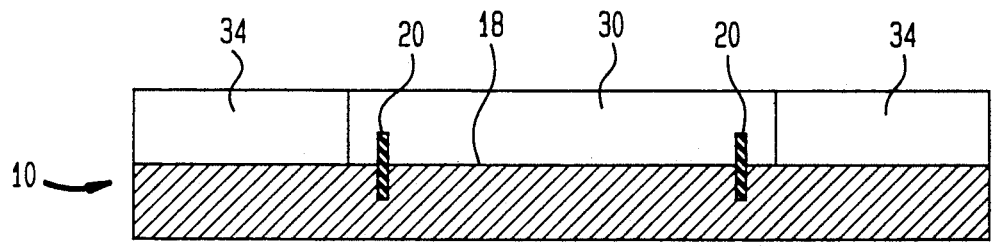
FIG. 3 is a sectional view of the inventive apparatus taken along line 3—3 of FIG. 1.
Figure 4:
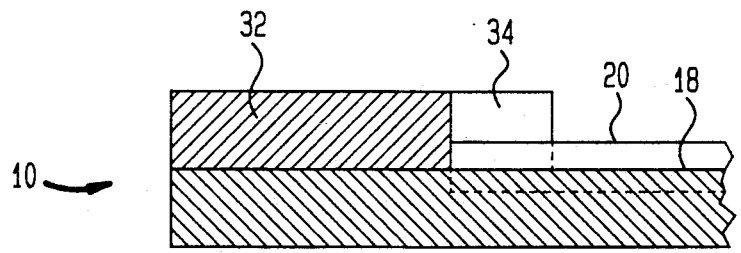
FIG. 4 is a sectional view of the inventive apparatus taken along line 4—4 of FIG. 1.

At the forward end 12 of frame 10 is an inner guide 30, best seen in FIGS. 1, 3, and 4. Inner guide 30 is a structure which is located on top surface 18. It constitutes a body portion 32 and two shoulder portions 34,34 which project towards the rear portion 14 of frame 10. Between the shoulders 34,34, a slot 36 is formed, the rails 20,20 extending into the slot 36 up to a rear edge 38 of inner guide 30. The optical character reader mounted on rails 20,20 is well received in the slot 36, with the edge 38 acting as a stop for the optical character reader. In this way, the initial position, and the final position as well, of the optical character reader can be precisely determined and carefully controlled.

The apparatus of the present invention is a simple device and the cost of manufacture is low. Nonetheless, it reduces reading errors by the optical character reader and represents an improvement over the apparatus disclosed in U.S. Pat. No. 4,758,732. Because its cost is low, it can be sold as an accessory to an optical character reader. With suitable modification, the apparatus of the present invention can be adapted to read information from forms and tables.

While the invention has been described by reference to a specific embodiment, this was for purposes of illustration only. Numerous alternative embodiments will be apparent to those skilled in the art and are considered to be within the scope of the invention.

We claim:

1. An apparatus for supporting and guiding an optical character reader across a document containing information to be read, comprising
   a frame having a top surface,
   first and second parallel rails disposed on said top surface of said frame, said first and second rails being suitable for supporting the optical character reader for sliding movement therealong,
   an inner guide located at a forward end of said frame, said inner guide including a slot suitable for receiving the optical character reader and acting as a stop to determine an initial position for the optical character reader, and
   a depression in said top surface of said frame between said first and second rails and dimensioned suitably for receiving the document to be read.

2. The apparatus of claim 1 wherein the document is a business card and said depression is dimensioned suitably for closely receiving the business card.

3. The apparatus of claim 1 wherein the document is an identification card and said depression is dimensioned suitably for closely receiving the identification card.

4. The apparatus of claim 1 wherein said depression is inclined.

5. The apparatus of claim 1 wherein said depression includes a clamping slot at a rear edge thereof into which the document may be inserted.

* * * * *